June 26, 1934.  A. J. FAUSEK ET AL  1,964,045
CUT-OFF DEVICE
Filed Aug. 12, 1929  2 Sheets-Sheet 1
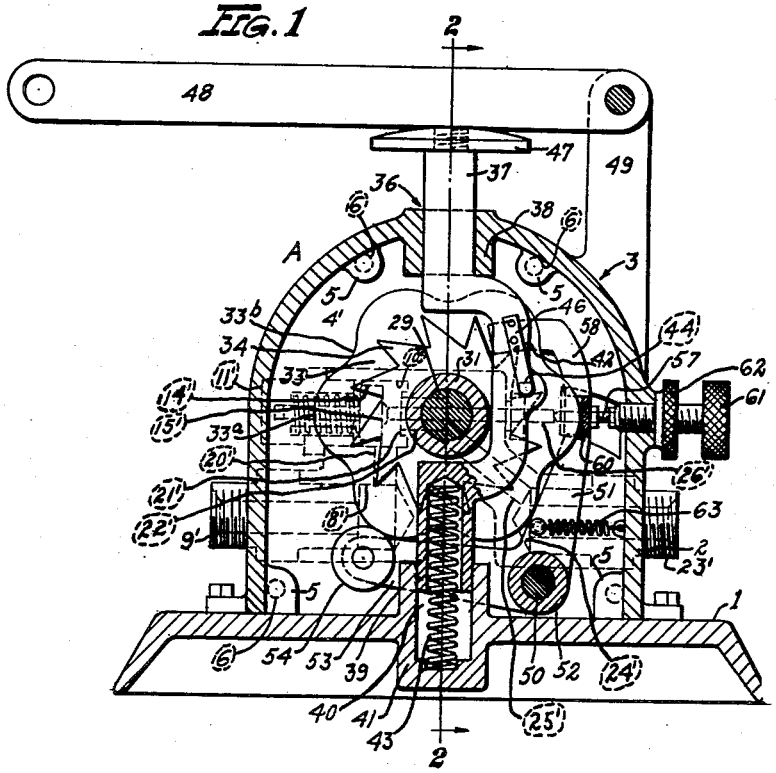
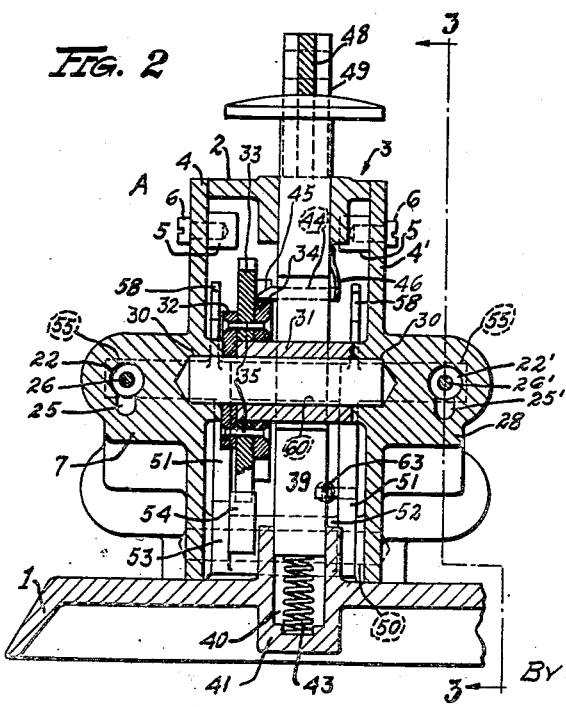
INVENTORS
A. J. FAUSEK
I. F. FAUSEK
BY
ATTORNEY June 26, 1934.　　A. J. FAUSEK ET AL　　1,964,045
CUT-OFF DEVICE
Filed Aug. 12, 1929　　2 Sheets-Sheet 2
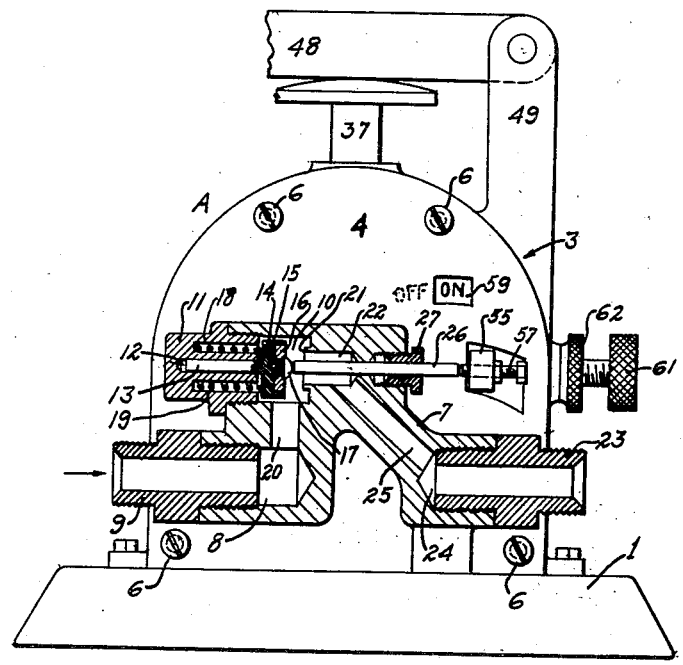
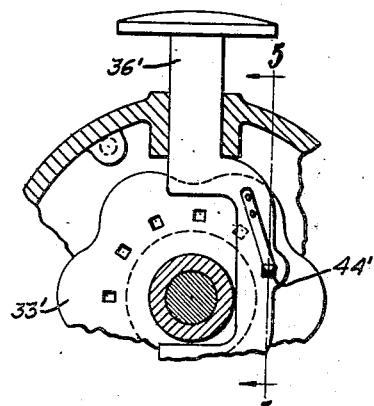
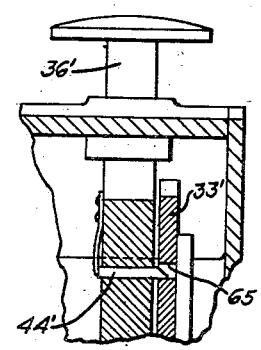
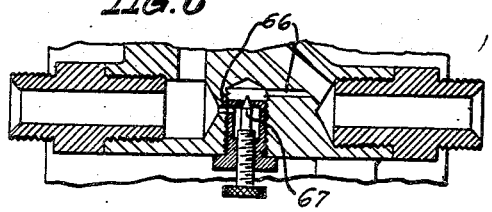
INVENTORS
A. J. FAUSEK
I. F. FAUSEK
BY
ATTORNEY Patented June 26, 1934

1,964,045

UNITED STATES PATENT OFFICE 1,964,045

CUT-OFF DEVICE

Arthur J. Fausek and Irwing F. Fausek, St. Louis, Mo.

Application August 12, 1929, Serial No. 385,409

6 Claims. (Cl. 137—139)

This invention relates generally to cut-off devices or valves and more specifically to gas controlling valves adapted for use with metal cutting and welding torches of the type employing oxygen and acetylene and other gases for producing cutting and welding flames, the predominant object of the invention being to provide an improved valve of this type which is simple in construction and efficient in use.

As is well known metal cutting and welding torches of the type referred to above are provided with separate valves for controlling passage through the torches of the fuel gas and the combustion supporting gas by which the cutting and welding flames are produced, and in the use of such torches the separate valves referred to are adjusted so the fuel gas and combustion supporting gas are properly proportioned to produce the desired flame. In the use of cutting and welding torches it frequently happens that the operators of the torches must lay the torches aside for a few moments in order to adjust the material being operated on, or for various other reasons, and as it would be dangerous for the torches to burn when so laid aside, it has been the practice heretofore, in most cases, for the operators to close the separate gas controlling valves referred to above and extinguish the flame. This had the effect, of course, of destroying the adjustment of the separate gas controlling valves on the torch and when the torch was again lighted it was necessary for the operator to perform the time consuming and gas wasting task of adjusting the valves to cause gas in proper proportions to be fed to the flame.

The main object of the present invention, therefore, is to provide an improved valve arrangement adapted for association with a cutting or welding torch, which will provide means for controlling the flow of gases through the torches without effecting the adjustment of the separate gas controlling valves referred to above. In the use of our improved valve the flame at the tip of the torch may be extinguished at any time and because the adjustment of the separate gas controlling valves was not disturbed when the flame was extinguished, the torch may again be lighted to produce a flame fed by gases in proper proportions.

Another important feature of the invention resides in the arrangement whereby a slight leakage of gases occurs at all times, when desired, at the tip of a torch associated with our improved valve. Because of this arrangement a pilot flame will be maintained at the tip of the torch when the torch is not being used and, therefore, when it is desired to light the torch it is necessary, merely, to permit the gases to flow to the tip of the torch where said gases will be ignited by the pilot flame.

Figure 1 is a vertical section through our improved valve.

Figure 2 is a vertical section taken approximately on line 2—2 of Figure 1.

Figure 3 is a vertical section taken approximately on line 3—3 of Figure 2.

Figure 4 is a fragmentary detail illustrating a modified form of the invention.

Figure 5 is a vertical section on line 5—5 of Figure 4.

Figure 6 is a fragmentary view illustrating another modified form of the invention.

In the drawings, wherein is shown for the purpose of illustration, merely, several embodiments of the invention, A designates our improved cut-off device which comprises a base portion 1 from which an arched wall 2 extends in an upward direction, said arched wall 2 constituting a portion of the housing 3 of the cut-off device A. The housing 3 of the device also includes side plates 4 and 4' which are secured to the arched wall 2 at opposite sides thereof, said arched wall being provided with lugs 5 provided with tapped openings adapted to receive screwthreaded portions of suitable fastening devices 6 whereby said side plates 4 are secured to said arched wall 2.

At the lower portion of the side plate 4 same is of increased thickness to provide a valve receiving portion 7 (Figures 2 and 3), said valve receiving portion being provided with a cavity 8 (Figure 3) into which a coupling member 9 is screwed. Formed in the valve receiving portion 7 of the plate 4 at a point above the cavity 8 is a cavity 10 into which a valve supporting element 11 is screwed, said element 11 being provided with a centrally disposed aperture 12 into which the stem 13 of a valve 14 is extended. The valve 14 includes a valve head 15 with which the stem 13 is associated, said valve head being recessed to receive a valve seat 16 formed of fiber or other suitable material and said seat 16 being maintained in place by being overlapped by the head portion of an element 17 which includes a screwthreaded shank portion screwed into a screwthreaded aperture in the valve head 15. The element 11 is provided with an annular recess 18 in which an expansible coil spring 19 is arranged, one end of said coil spring being seated against the inner end of the recess 18 and the opposite end thereof being in contact with the valve head 15 of the valve 14 as shown in Figure 3. In view of this arrangement, it is plain that the coil spring 19 tends to move the valve head 15 in a direction away from the element 11. 20 designates a passageway which places the cavities 8 and 10 in communication with each other.

Located at the inner wall of the cavity 10 is a valve seat 21 with which the valve seat 16 associated with the valve head 15 is adapted to contact, there being a cavity 22 leading inwardly from said valve seat 21 as shown in Figure 3. Disposed at the side of the valve receiving portion 7 opposite to the side thereof at which the coupling member 9 is arranged is a similar coupling member 23 which is screwed into a cavity 24 formed in said valve receiving portion. The cavity 24 is placed in communication with the cavity 22 already referred to by a gas passageway 25. 26 designates a valve operating rod which is supported for reciprocal movement by the valve receiving portion 7, said rod at its inner end being in contact with the head portion of the element 17 and at its opposite end being extended beyond a face of the valve receiving portion 7 as shown in Figure 3. 27 designates a packing gland which surrounds the valve operating rod 26 and is screwed into a cavity formed in the valve receiving portion 7 whereby leakage of gas around the valve operating rod is prevented.

At the opposite side of the device A the side plate 4' is provided with a lower portion of increased thickness which also provides a valve receiving portion 28 (Figure 2), and this valve receiving portion is provided with gas passageways and valve mechanism corresponding exactly to the gas passageways and valve mechanism within the valve receiving portion 7 of the side plate 4. In other words, as shown mostly by dotted lines in Figure 1, the valve receiving portion 28 has associated with it a coupling member 9' which is screwed into a cavity 8' arranged in communication with a cavity 10' through the instrumentality of a passageway 20'. Likewise a valve supporting element 11' is screwed into the cavity 10' and this element supports a valve 14' which is operated by a valve operating rod 26', the valve head 15' of the valve 14' being adapted to move into and out of contact with a valve seat 21' at the inner end of the cavity 10'. The cavity 10' is arranged in communication with a cavity 24' by a cavity 22' and a gas passageway 25', and a coupling member 23' is screwed into the cavity 24'.

Arranged transversely of the housing 3 of the device A is a central shaft 29 which is supported in suitable bearings 30 formed on the side plates 4 and 4', and mounted on said shaft is a sleeve 31. The sleeve 31 is spaced apart slightly at one end thereof from the bearing 30 associated with the side plate 4 as shown in Figure 2, and a disk 32, having a central opening through which the shaft 29 passes, is extended into said space. Because of this arrangement the disk 32 is capable of rotating freely about the shaft 29 and is prevented by the sleeve 31 and bearing 30 on the side plate 4 from moving laterally of the housing 3. 33 designates a cam having alternate high and low portions 33$^a$ and 33$^b$ respectively as shown in Figure 1, and 34 designates a ratchet wheel which is supported by the sleeve 31. The cam 33 and ratchet wheel 34 are secured to the disk 32 by means of fastening devices 35 whereby said disk, cam, and ratchet wheel will move as a unit.

36 designates a vertically movable operating element which comprises an upper portion 37 movable through a bearing 38 formed on the wall 2 of the housing 3, a lower portion 39 extended into and arranged for vertical movement in a recess 40 formed in a portion 41 formed on the base 1, and an intermediate offset portion 42 which joins the portions 37 and 39 of said operating element. The intermediate portion 42 is offset to clear the shaft 29 and sleeve 31 as shown in Figure 1, and the lower portion 39 is recessed to receive a coil spring 43, said coil spring contacting at its opposite ends with the top wall of the recess in the portion 39 and the bottom wall of the recess 40 in the portion 41 of the base, whereby said coil spring tends to move the operating element upwardly. Formed through the intermediate portion 42 of the operating element is an aperture through which a pawl 44 is extended, said pawl having an inclined face 45 at one end thereof, and at its opposite end said pawl being acted upon by a leaf spring 46 which tends to force the pawl in a direction toward the ratchet wheel 34. At the upper end of the operating element 36 same is provided with a head portion 47 and 48 designates an arm which contacts with the head portion 47 and is pivoted to an upstanding element 49 formed on the wall 2 of the housing 3.

Located in the lower portion of the housing 3 is a shaft 50 which extends transversely of the housing and mounted for rocking movement on said shaft is an element which comprises a pair of upwardly extended arms 51 joined together at their lower ends by an elongated sleeve 52. One of the arms 51 of the element referred to is provided with a forwardly extended arm portion 53 which carries at its outer end a roller 54, said roller being arranged in contact with the peripheral face of the cam 33 as shown in Figures 1 and 2. At their upper ends the arms 51 are turned outwardly as shown by dotted lines in Figure 2, said outwardly extended portions being designated by the reference character 55 and being extended through arcuate slots 56 in the side plates 4 and 4' of the housing 3, and at the outer end thereof each outwardly extended portion 55 is provided with an adjusting screw 57 which extends through an opening in the portion 55 and is provided with a lock nut for locking same in any position to which same has been adjusted. The adjusting screws 57 contact with the outer ends of the valve operating rods 26 and 26' as shown in Figures 1 and 3.

Extended upwardly from the upper ends of the arms 51 are portions 58 providing indicating flags, said portions being arranged adjacent to openings 59 in side plates 4 and 4' and said flags bearing the words "On" and "Off." In the use of the device, as will be hereinafter clearly set forth, the element of which the arms 51 form parts is rocked on the shaft 50 and when this happens the word "On" or "Off" will be displayed at the openings 59 to indicate the position of the mechanism of the device.

Extended from one of the bars 51 to the other thereof is a bar 60 (Figure 2) and supported by the wall 2 of the housing 3 at a point in horizontal alinement with said bar is a regulating screw 61. The screwthreaded shank of the regulating screw 61 extends through a screwthreaded opening in the wall 2 of the housing 3 and the inner end of said screwthreaded shank may be adjusted toward and away from the bar 60 by rotating the screw 61 and in this manner an adjustable stop for the arms 51 is provided. The regulating screw 61 has a lock nut 62 associated with it whereby same may be locked in various positions to which it has been adjusted.

In the use of our improved device the coupling member 9 is connected to the oxygen container by a suitable conductor, and the coupling member 23 is placed in communication with the oxygen passageway of the torch being used by a suitable flexible conductor. Likewise the coupling member 9' is connected to the fuel gas container by a suitable conductor, and the coupling member 23' is placed in communication with the fuel gas passageway of the torch by a suitable flexible conductor. With the device so connected to the gas containers and the torch and with the valves 14 and 14' in open positions gas will flow through the device to the torch and said torch may be lighted and the valves thereon adjusted to proportion the gases so as to produce a flame at the tip of the torch which has the desired characteristics.

When the valves 14 and 14' are in open positions and the torch is burning the mechanism within the housing 3 of the device is positioned as shown in Figure 1, and when the operator desires to extinguish the flame at the tip of the torch it is necessary merely that he depress the operating element 36. On depression of the operating element as described the pawl 44 engages a tooth of the ratchet wheel 34 and rotates said ratchet wheel, together with the cam 33 and the disk 32, a distance equal to the space between two adjacent teeth of the ratchet wheel. This will have the effect of moving a low spot 33$^b$ of the cam 33 into alinement with the roller 54, thus permitting the coil spring 63 to move the upper ends of the arms 51 rearwardly and the forward end of the arm 53, together with the roll 54, upwardly as the roller passes into the low spot of the cam. On rearward movement of the upper portions of the arms 51 the coil springs 19 and 19' will seat the valves 14 and 14' thus cutting off the passage of gas through the device. When the operator of the torch again desires to use same he again depresses the operating element 36 whereby the cam is again rotated a distance equal to the space between two adjacent teeth of the ratchet wheel, thus causing a high spot 33$^a$ to move the roller 54 outwardly and moving the upper portions of the arms 51 forwardly to unseat the valves 14 and 14', and as the adjustment of the valves on the torch has not been altered the flame will be fed by properly proportioned gases. The operating element 36 may be depressed by the operator moving a hand or foot against the head portion 47 thereof in which event the arm 48 will be removed, or, if the device is in an elevated position a cord may be connected to the outer end of the arm 48 and said cord pulled so as to cause said arm to move the operating element downwardly.

The purpose of the regulating screw 61 is to provide a stop for the arms 51 which will prevent complete closing of the valves 14 and 14'. In this way, a slight leakage of gas will be present at the tip of the associated torch at all times, thus providing for the maintainence of a pilot flame at the torch tip when the torch is not being used.

In Figures 4 and 5 we show a modified form of the invention in accordance with which the ratchet wheel 34 of the preferred construction is eliminated. In the modified form of the invention the cam 33' is provided with spaced apertures 65 into which the pawl 44' is extended, and when the operating element 36' of the modified construction is depressed the pawl engaging a wall of one of the apertures will cause the cam to be moved a distance equal to the space between two apertures.

Instead of the regulating screw 61 of the preferred construction we may employ the means illustrated in Figure 6 for maintaining a pilot flame at the tip of the torch. This means comprises forming by-passes 66 for the gas around the valves 14 and 14' and arranging a hand-operated valve 67 in each of said by-passes. By unseating the valves 67 it will be possible to permit a slight leakage of gas at the tip of the torches when said torches are not being used whereby pilot flames will be maintained at the tips of said torches.

An important feature of our invention resides in the use of the screws 57 which are carried by the outwardly extended portions 55 of the arms 51. These screws may be adjusted so as to cause one or the other of the valves 14 and 14' to open in advance of the associated valve when such arrangement is desirable.

We claim:

1. A cut-off device comprising a housing, a valve located outside of said housing, a pivoted member located within said housing, said pivoted member being in the form of a bell crank lever provided with a portion which is extended through an opening formed through a wall of said housing and adapted to unseat said valve on movement of said pivoted member, a rotatable element located within said housing and provided with circumferentially spaced operating faces arranged to impart movement to said pivoted member, and means for imparting step by step movement to said rotatable element to successively bring said operating faces into valve-operating positions with respect to said pivoted member.

2. A cut-off device comprising a housing, a valve located outside of said housing, a pivoted member located within said housing, said pivoted member being in the form of a bell crank lever provided with a portion which is extended through an opening formed through a wall of said housing and adapted to unseat said valve on movement of said pivoted member, a rotatable element located within said housing and provided with circumferentially spaced operating faces arranged to impart movement to said pivoted member, and means including a ratchet and pawl for imparting step by step movement to said rotatable element to successively bring said operating faces into valve-operating positions with respect to said pivoted member.

3. A cut-off device comprising a housing, a valve located outside of said housing, a pivoted member located within said housing, said pivoted member being in the form of a bell crank lever provided with a portion which is extended through an opening formed through a wall of said housing and adapted to unseat said valve on movement of said pivoted member, a cam located within said housing and provided with circumferentially spaced operating faces arranged to impart movement to said pivoted member, and means including a ratchet and pawl for imparting step by step movement to said cam to successively bring said operating faces into valve-operating positions with respect to said pivoted member.

4. A cut-off device comprising a housing, a valve located outside of said housing, a pivoted member located within said housing, said pivoted member being in the form of a bell crank lever provided with a portion which is extended through an opening formed through a wall of said housing and adapted to unseat said valve on movement of said pivoted member, a cam located within said housing and provided with circumferentially spaced operating faces arranged to impart movement to said pivoted member, means including a ratchet and pawl for imparting step by step movement to said cam to successively bring said operating faces into valve-operating positions with respect to said pivoted member, and means for permitting slight leakage of fluid through the device when the valve-operating mechanism is in the position same assumes when the valve is closed.

5. A cut-off device comprising a housing, a valve located outside of said housing, a pivoted member located within said housing, said pivoted member being in the form of a bell crank lever provided with a portion which is extended through an opening formed through a wall of said housing and adapted to unseat said valve on movement of said pivoted member, a cam located within said housing and provided with circumferentially spaced operating faces arranged to impart movement to said pivoted member, means including a ratchet and pawl for imparting step by step movement to said cam to successively bring said operating faces into valve-operating positions with respect to said pivoted member, and means for permitting slight leakage of fluid through the device when the valve-operating mechanism is in the position same assumes when the valve is closed, the last mentioned means comprising a stop for limiting movement of said pivoted member in one direction.

6. A cut-off device comprising a housing, a valve located outside of said housing, a pivoted member located within said housing, said pivoted member being in the form of a bell crank lever provided with a portion which is extended through an opening formed through a wall of said housing and adapted to unseat said valve on movement of said pivoted member, a cam located within said housing and provided with circumferentially spaced operating faces arranged to impart movement to said pivoted member, means including a ratchet and pawl for imparting step by step movement to said cam to successively bring said operating faces into valve-operating positions with respect to said pivoted member, and means for permitting slight leakage of fluid through the device when the valve-operating mechanism is in the position same assumes when the valve is closed, the last mentioned means comprising an adjustable stop for limiting movement of said pivoted member in one direction.

ARTHUR J. FAUSEK.
IRWING F. FAUSEK.